April 25, 1944.   E. BINDER   2,347,590
ELECTRICALLY OPERATED CONTROL DEVICE
Filed Nov. 7, 1940   3 Sheets-Sheet 2

Inventor:
Eugen Binder
By A. D. Adams
Attorney

April 25, 1944.    E. BINDER    2,347,590
ELECTRICALLY OPERATED CONTROL DEVICE
Filed Nov. 7, 1940    3 Sheets-Sheet 3
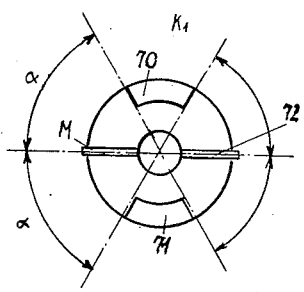
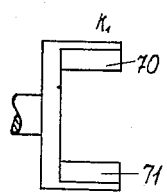
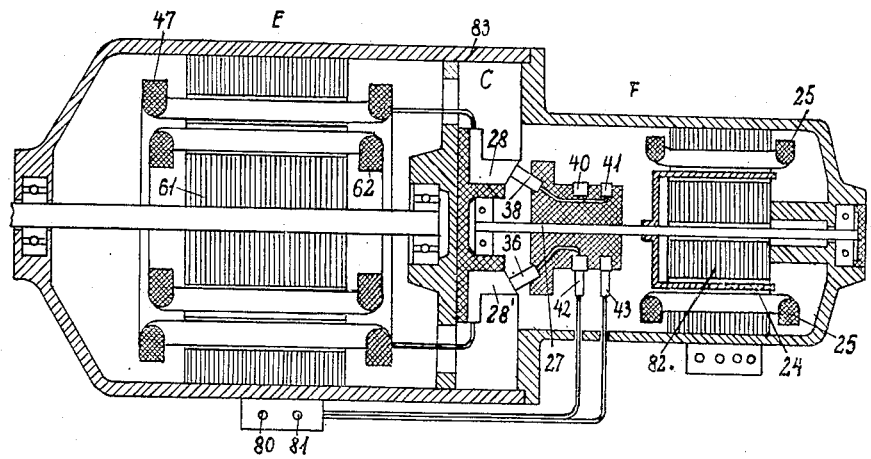
Inventor:
Eugen Binder
By A. D. Adams
Attorney Patented Apr. 25, 1944

2,347,590

UNITED STATES PATENT OFFICE 2,347,590

ELECTRICALLY OPERATED CONTROL DEVICE

Eugen Binder, Berlin, Germany; vested in the Alien Property Custodian

Application November 7, 1940, Serial No. 364,730 In Germany August 3, 1939

1 Claim. (Cl. 172—239)

The invention relates to improvements in electrical devices for controlling a physical condition, as for instance a temperature, a pressure, a quantity of a flow medium, or for remote-transmission of a controlling impulse.

The first aim of the invention is to render such devices suitable for actuating an electro-motor setting a heavy controlled member, as for instance a throttle, a valve or the like, in dependence on a controlling impulse.

The invention further aims at reducing the influence of inertia in such devices in order to obtain a movement of the controlled member the phase and amount of which corresponds to the phase and amount of the controlling impulse.

Another object is to render such a device suitable for responding to even a feeble impulse of any kind.

It is a further object of the invention to use a special motor of smallest possible power which is directly controlled by the impulse system and to use a special means for amplifying the torque of the motor in order to actuate a second motor in synchronism with the small power motor for obtaining an arrangement particularly suitable for regulating purposes and which meets the following requirements:

(1) Smallest inertia and hence the smallest possible lagging of the motor which is directly controlled by the controlling impulse.

(2) Proportionality between the controlling current and the speed of the motor directly controlled by the impulse.

(3) Independence on the part of the speed of the motor directly controlled by the impulse and of the power motor on the amount of the mechanical power delivered by the second motor.

(4) Proportionality between the electrical power feeding the system and the amount of the mechanical power delivered by the power motor.

(5) Reduced heat development when the system is at a standstill.

Figure 1:
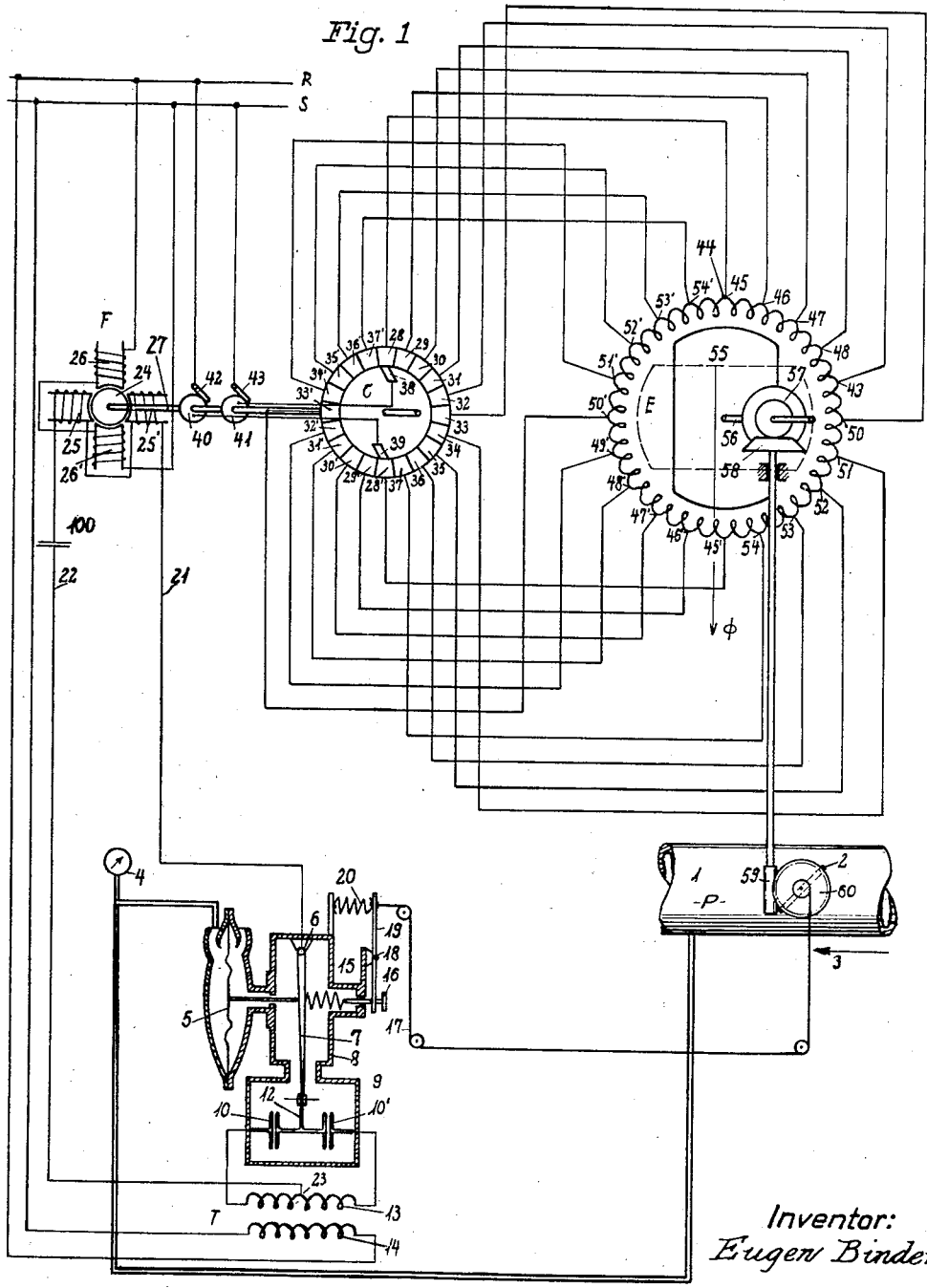
Figure 2:
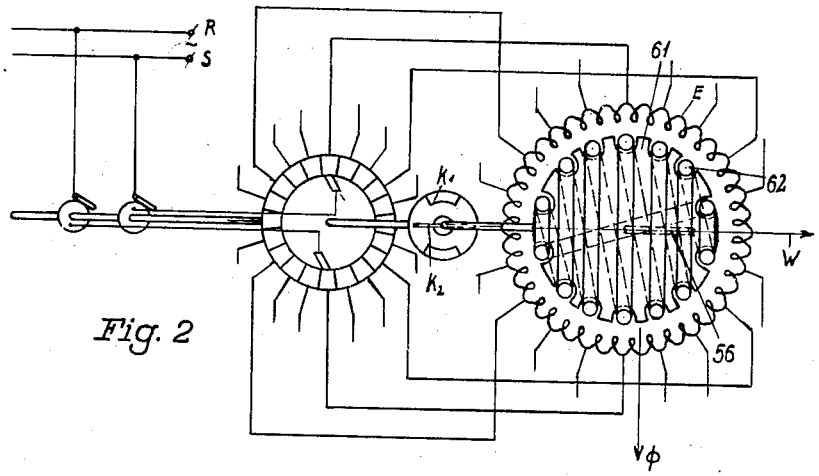
Figure 3:
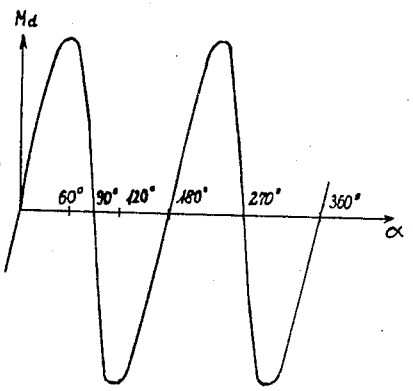

In the following the invention is explained in greater detail, reference being had to the accompanying drawings, of which Fig. 1 is a diagrammatic view of a complete arrangement in accordance with the invention, Fig. 2 shows a modification of the embodiment according to Fig. 1, in which certain parts are omitted, Fig. 3 is a diagram of the torque obtained in the system to be described, Figs. 4 to 7 represent a detail of the arrangement in different views, and Fig. 8 is a sectional view showing a constructional combination of the various parts in accordance with the invention.

Fig. 1 illustrates an arrangement for maintaining constant a pressure in the pipe conduit 1 by means of a throttle 2. The arrow 3 points in the direction in which the medium flows through the pipe conduit 1 whilst $p$ is the pressure behind the throttle 2. The pressure $p$ acts upon a diaphragm 5, the movements of which are transmitted to a lever 7 turnably mounted about an axle 6 in the casing 8. The lever 7 is rigidly connected to the center electrode 12 of a liquid potentiometer 9, the two outer electrodes 10, 10' of which are connected to the secondary winding 13 of a transformer T. The primary of the transformer T is fed by the A. C. network RS. The pressure impulse is counteracted by a compression spring 15 the tension of which may be varied by means of a set screw 16 adjustably mounted on one arm of a double armed lever 19 which is in turn turnably mounted about an axle 18 on the casing 8. The one end of a tension spring 20 is connected to the other arm of the lever 19 and the other end of the spring to the casing 8. The tension of the spring is counteracted by the tension of the rope 17 which is connected to the throttle 2 in such manner that at increased pressure upon the diaphragm 5 the throttle 2 tends to close and to move the lever 19 in the clockwise direction by means of the rope 17, thereby compressing the adjusting spring 15. It follows from the above that the desired pressure may be adjusted manually by means of the set screw 16 whilst the lever 7 by means of the rope 17 is restored in dependence on the position of the throttle 2.

F is a Ferraris motor whose stator windings 25, 25' are series connected with a capacity 100. The series connection is by means of the conductors 21, 22 connected to the center electrode 12 of the liquid potentiometer 9 and the center tap 23 of the secondary winding of the transformer T. Other series connected stator windings 26, 26' of the Ferraris motor, the field of which is displaced in space and phase to the field of the windings 25, 25', are directly connected to the network RS. The induced part of the Ferraris motor is formed as a conducting drum. The speed and the direction of rotation of this motor is dependent of the direction and the amount of displacement by the impulse of the center electrode 12.

Coaxially to the shaft 27 of the Ferraris motor there is arranged a stationary collector ring formed by twenty conducting segments 28—37 and 28'—37', which are insulated relative to each other, the diametrically arranged segments being designated by 28, 28' to 37, 37', respectively. Two brushes 38, 39 sliding on the segments are supported by the shaft 27. The brushes 38, 39 are fed by the A. C. from the network RS by means of rings 40, 41 mounted on the shaft 27 and stationary brushes 42, 43 sliding thereon. A motor E which is controlled by the collector C has a stationary closed two-pole winding 44 which is illustrated schematically as an annular winding. The winding 44 possesses 20 taps disposed at equal intervals over the circular winding of which taps any two diametrically opposed taps 45, 45'—54, 54', are connected with two diametrically opposed segments 28, 28'—37, 37', respectively, of the stationary collector ring. The number of the taps of the winding 44 therefore corresponds to the number of the conducting collector segments. The rotor 55 of the motor E consists of a laminated soft iron piece with a magnetic conductance which is mainly directed perpendicularly to the revolving axle 56 of the motor E. The valve 2 in the pipe conduit 1 is adjusted by means of the shaft 56 via a bevel gear 57, 58, a worm 59 and a worm gear 60.

This arrangement operates as follows:

Be it assumed that the brushes 38, 39 when the regulating device is at a standstill are in contact with the segments 28, 28', then the current from the A. C. network RS flows over the segments 28, 28', respectively, and the taps 45, 45', respectively, through the parallel-connected halves of the winding 44 of the motor E, producing in the winding 44 a stationary, single-phase alternating field $\phi$ passing through the rotor 55. The rotor therefore adjusts itself in the direction of this field. As soon as the Ferraris motor F runs, it causes the brush pair 38, 39 to revolve. As during the revolutions of the brush pair 38, 39 the A. C. is conducted from the consecutive diametrical segments to the consecutive diametrical taps of the motor E, the alternating magnetic field $\phi$ produced in the winding 44 of the motor runs synchronously with the brush pair 38, 39. The rotor 55 always tends to adjust itself in the direction of the stator field axis, i. e. it synchronously follows the movement of the stator field $\phi$. Complete synchronism therefore exists between the motor E and the controlling motor F. The power of the controlling motor is therefore required only for overcoming its own friction within the bearings and the friction of the sliding rings 40, 41 and the collector C, while the power delivered by the synchronous motor E is supplied from the A. C. network RS. The number of the collector lamellas and the number of taps of the winding 44 may be chosen so as to obtain any desired accuracy in the angular transmission.

Due to the high inductance of the winding 44, the power supplied from the network is small when the motor is at a standstill. As soon as the stator field is rotated with respect to the rotor of the motor E, when the collector brushes are rotating the loader motor lags with respect to the axis of the stator field corresponding to the size of the load, hence the inductivity in the magnetic flux of the stator field winding decreases, and, due to this the power supplied from the net RS increases corresponding to the amount of the load. The system C E described serves to amplify the torque of the controlling motor F which torque is in turn proportional to the controlling current delivered by the relay 9.

If the pressure behind the throttle 2 is to be maintained constant, the arrangement may be made in such manner that the movable electrode 12 at a certain pressure lies in the middle between the stationary electrodes 10, 10'. In consequence thereof the movable electrode has the same potential as the electric center tap 23 of the transformer T. The field magnet system 25, 25' of the Ferraris motor F is therefore not excited, so that the motor is at a standstill. When the pressure varies in the conduit, the movable electrode 12 is displaced from its middle position. The Ferraris motor begins to run and moves the throttle so as to counteract the pressure variation. The electrode 12 assumes its middle position between the electrodes 10 and 10' thereby putting the motor out of action.

Ferraris motors are eminently suitable for regulating purposes. They are of very small mass and therefore of small inertia. Consequently their speed and torque are approximately proportional to the controlling current even in the range of very weak controlling currents. It is advantageous to use a Ferraris motor the movable induced part of which has a conducting drum. The Ferraris motors of this type are much superior to the Ferraris motors having an induced movable disc on account of the smallness of the moment of inertia, as for the purpose of producing the same torque in a Ferraris motor of the disc type the outer diameter of the movable induced part—on which the amount of the inertia largely depends—must be chosen considerably greater than the outer diameter of the drum, whose cylindric shell is the part intersecting the magnetic flux and hence may be of a much smaller diameter. By using a Ferraris motor of the drum type, the ratio of the torque to the moment of inertia of the rotor may be greater than in using a Ferraris motor of the disc type. The motor of the drum type has besides a greater inherent electric self-damping property so that the ratio of the damping to the moment of inertia of the rotor is considerably more favorable than that of the motor of the disc type whereby a more rapid braking of the moved part of the motor is ensured. This is of great importance more particularly in the case of rapidly changing regulating conditions for attaining a regulation proceeding as much as possible in the same phase as the impulse. The use of an A. C. fed Ferraris motor has furthermore the advantage that the control motor and the torque amplifier may be fed from the same network.

An additional advantage of the described arrangement—in which no reaction is exerted on the control motor driving the torque amplifying means—is that the speed of the controlling motor and hence the speed of the power motor are independent of the mechanical power delivered by the power motor.

If the collector brushes are fed by D. C., the power delivered by the network is greatest when the system is at a standstill while the operating power is reduced in the course of operation due to the counter-electromotive force which will be produced in the rotary field winding of the power motor. As a regulating device is mainly at a standstill, it is desirable that the power supplied by the network in the period of standstill is small in comparison with the power supplied from the network to the loaded motor and that the power supplied from the network increases in dependence on the load. If the system is fed by A. C., then, as explained above, the power supplied from the network is the greater, the more the rotor is loaded. Correspondingly the A. C. fed system develops least heat when at a standstill while in a D. C. fed system the heat development is greatest during the standstill.

In the embodiment according to Fig. 2 the armature of the rotor 61 carries a short circuited winding 62 the axis of which is designated by W. The rotor tends to adjust the axis W of the winding 62 vertically to the axis $\phi$ of the magnetic stator field. If the rotor is loaded, an angle exists between the axis W and the rotating stator field axis $\phi$. The greater the load of the rotor, the greater is the angle of lag. In consequence an electromotive force is induced in the short circuited winding producing a current of corresponding amount. A load current is added to the no-load current in the stator winding so that the power consumption increases in proportion to the increase in load.

In the no-load condition the rotor of the motor E will follow the stator field rotation while the rotor at an increasing load lags more and more until at an angle of lag of 90° (indicated by dotted lines in Fig. 1) it is equally influenced by both poles of the stator field so that the torque exerted by the stator field upon the rotor is zero, i. e. the rotor is in a state of instability. The greatest load capacity in this case occurs at an angle of lag of about 60° which should not be exceeded, as otherwise the motor falls out of step. Fig. 3 shows the entire course of the lagging angle $\alpha$ in dependence on the amount of the torque $M_d$ on the motor shaft in the case of a two-pole motor. As will be apparent, the rotor is unstable in two positions, namely at the angles of 90° and 270°.

Figure 6:
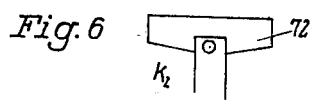
Figure 7:
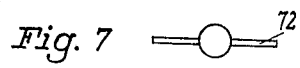

In order to prevent the rotor shaft 56 from falling out of step relative to the collector shaft 27, these may be interconnected by two coupling elements $K_1$, $K_2$ (cfr. Fig. 2) possessing stops admitting only a limited angular displacement between the two shafts. Such a coupling is illustrated in a plan view in Fig. 4 while Figs. 5, 6 and 7 show the coupling members singly. Fig. 5 represents the coupling member $K_1$ in elevation while the other coupling member $K_2$ is illustrated in Figs. 6 and 7, Fig. 6 showing an elevation and Fig. 7 a plan view. The coupling member $K_1$ possesses two claws 70, 71 the edges of which include an angle of lag of $2\alpha$. The coupling member $K_2$ has a knife 72 which is arranged transversely to the shaft end and which is turnable from the middle position M shown in Fig. 4 relative to the claws 70, 71 by the angle $\alpha$ in both directions of rotation. If the coupling members are relatively arranged in such manner that, if the rotor is in its stable position with respect to the stator field, i. e. if the soft iron core assumes a position in the direction of the stator field $\phi$, or, alternatively, the short circuited winding is at right angles to the stator field, the coupling member 72 being in the middle position between the two claws 70 and 71, as shown in Fig. 4, the loaded rotor is capable of lagging behind the stator field in both directions by the amount of the angle $\alpha$. In this case the coupling member 72 strikes against the two claws. If the arrangement provides for the coupling member 72 to move by 60° in both directions (see Fig. 3) the motor can develop its maximum torque when the two coupling members strike the respective stops.

Fig. 8 shows the controlling motor F, the collector C and the power motor E to be arranged in a structural unit. 25, 25' are the control windings, 62 the centric iron core and 24 the rotor of the Ferraris motor rotating between the iron core and the field magnet 25, 25'. The drum shaft 27 of the controlling motor drives the brush pair 38, 36 which is in contact with the segments 28, 28' of the collector C. E is the synchronous motor having a rotor winding 62. 80, 81 are the terminals for the A. C. source. From these terminals two conductors lead to two brushes 42, 43 which supply the sliding rings 40, 41. The two motors, the collector and the sliding rings are coaxially arranged in the casing 83.

Although the invention is explained in connection with a regulating device in which a collector is driven by a Ferraris motor, the invention is restricted neither to the Ferraris motor nor to the regulating purpose. Either an electric, hydraulic or pneumatic motor might serve as controlling motor. Furthermore the motor driving the collector might be a receiver motor running synchronously with a remotely arranged transmitter, as for instance a synchronous motor.

What is claimed is:

An electrically operated control device comprising in combination a controlling impulse system; an electrical power source; a relay controlling said electrical power source; an electric motor of low power and inertia; said impulse system acting upon said relay for feeding said motor with electric power varying in response to the amount and direction of the controlling impulse, thereby correspondingly varying the speed and direction of rotation of the motor; an A. C. fed rotating commutator driven by the motor; a second electric motor of considerable power and of the rotating field type controlled by the commutator for actuating a heavy regulating member in response to the variations of said controlling impulse and a coupling member provided between the rotating commutator and the second motor, said coupling member permitting only a limited displacement of the second motor relative to the first motor in both directions of rotation.

EUGEN BINDER.